United States Patent
Dudar et al.

(10) Patent No.: US 11,060,877 B2
(45) Date of Patent: Jul. 13, 2021

(54) OPPORTUNISTIC FUELING FOR AUTONOMOUS VEHICLES

(71) Applicant: Ford Global Technologies, LLC, Dearborn, MI (US)

(72) Inventors: Aed M. Dudar, Canton, MI (US); Finn Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 277 days.

(21) Appl. No.: 16/207,294

(22) Filed: Dec. 3, 2018

(65) Prior Publication Data
US 2020/0173800 A1 Jun. 4, 2020

(51) Int. Cl.
*G01C 21/34* (2006.01)
*G05D 1/00* (2006.01)
*G06Q 50/30* (2012.01)
*G06Q 30/02* (2012.01)
*G05D 1/02* (2020.01)

(52) U.S. Cl.
CPC ....... *G01C 21/3469* (2013.01); *G01C 21/343* (2013.01); *G01C 21/3476* (2013.01); *G05D 1/0088* (2013.01); *G05D 1/0217* (2013.01); *G06Q 30/0283* (2013.01); *G06Q 50/30* (2013.01); *G05D 2201/0213* (2013.01)

(58) Field of Classification Search
CPC .............. G01C 21/3469; G01C 21/343; G01C 21/3476; G05D 1/0088; G05D 1/0217; G05D 2201/0213; G06Q 50/30; G06Q 30/0283
See application file for complete search history.

(56) References Cited

U.S. PATENT DOCUMENTS

| | | | |
|---|---|---|---|
| 2003/0069684 A1 | 4/2003 | Reimer | |
| 2007/0290039 A1 | 12/2007 | Pfleging et al. | |
| 2010/0198508 A1* | 8/2010 | Tang | G01C 21/3469 701/414 |
| 2012/0200259 A1* | 8/2012 | Sullivan | B60L 53/66 320/109 |
| 2014/0046585 A1* | 2/2014 | Morris, IV | G01C 21/3415 701/468 |
| 2015/0153195 A1 | 6/2015 | Burlingham et al. | |

(Continued)

OTHER PUBLICATIONS

Sharma, T.K., "How Blockchains can help the Taxi Industry," Block Chain Council, Published Jan. 2, 2018 (7 pages). Retrieved from: https://www.blockchain-council.org/blockchain/how-blockchains-can-help-the-taxi-industry/.

(Continued)

*Primary Examiner* — Sze-Hon Kong
(74) *Attorney, Agent, or Firm* — Brandon Hicks; Eversheds Sutherland (US) LLP

(57) ABSTRACT

Opportunistic fueling for car hailing autonomous vehicles are disclosed herein. An example method includes evaluating a trip schedule having one or more destinations for a vehicle, calculating a plurality of potential routes based on the trip schedule with fueling options along a proposed path of travel for the vehicle, applying one or more vehicle fueling constraints, selecting an optimized route from the plurality of potential routes for the vehicle using the one or more vehicle fueling constraints, and completing the trip schedule using the optimized route.

18 Claims, 4 Drawing Sheets

(56) References Cited

U.S. PATENT DOCUMENTS

| | | | | |
|---|---|---|---|---|
| 2015/0154638 A1* | 6/2015 | Burlingham | G06Q 30/0259 | 705/14.57 |
| 2016/0033293 A1* | 2/2016 | Nobrega | G01C 21/3461 | 701/423 |
| 2016/0091338 A1* | 3/2016 | Abuelsaad | G01C 21/3469 | 701/538 |
| 2017/0262790 A1* | 9/2017 | Khasis | G08G 1/012 | |
| 2017/0362076 A1* | 12/2017 | Hall | B67D 7/145 | |
| 2017/0363432 A1* | 12/2017 | Hall | B67D 7/04 | |
| 2018/0075567 A1* | 3/2018 | Mycroft | G06Q 50/30 | |
| 2018/0080777 A1* | 3/2018 | Nimchuk | G01C 21/3415 | |
| 2018/0107219 A1* | 4/2018 | Harris | G06Q 30/0265 | |
| 2018/0124213 A1 | 5/2018 | Wood | | |
| 2019/0016384 A1* | 1/2019 | Carlson | B60W 30/00 | |
| 2019/0293443 A1* | 9/2019 | Kelly | G08G 1/096827 | |
| 2020/0104965 A1* | 4/2020 | Ramot | G06Q 30/0621 | |
| 2020/0117204 A1* | 4/2020 | Lindemann | G01C 21/3469 | |
| 2020/0122588 A1* | 4/2020 | Cserna | B60L 7/10 | |
| 2020/0160709 A1* | 5/2020 | Ramot | G06Q 10/06312 | |
| 2020/0202715 A1* | 6/2020 | Mota | G01C 21/3476 | |

OTHER PUBLICATIONS

Wehner, M., "This app will deliver on-demand gas straight to your car," The Daily Dot, Published May 15, 2015 (7 pages). Retrieved from: http://www.dailydot.com/technology/filld-gas-delivery-on-demand/.

HERE Fuel Prices: Locating your preferred fuel station. (5 pages). Retrieved from: https://www.here.com/en/products-services/automotive-suite/connected-vehicle-services/fuel-prices.

"How Automakers Can Survive the Self-Driving Era," AT Kearney, pp. 1-38.

\* cited by examiner

OPPORTUNISTIC FUELING FOR AUTONOMOUS VEHICLES

CROSS REFERENCE TO RELATE APPLICATIONS

N/A

FIELD OF THE DISCLOSURE

The disclosure generally relates to vehicle fueling, and more particularly, but not by limitation, to systems and methods for fueling autonomous vehicles (AVs).

BACKGROUND

Conventional personal vehicles accumulate 10,000-15,000 miles annually. In the future, ride hailing/sharing vehicles are projected to accumulate 250,000 miles approximate every three years as they engage in car sharing/hailing paradigms. A ride hailing/sharing vehicle will likely have many short rest periods, referred to generally herein as idle time, and many key off and ignition events. With the car hailing models, fueling may need to be a daily task or even occur multiple times throughout the day.

Relatedly, fuel prices vary dramatically depending on location and method of fueling (stationary gas station compared with mobile on demand fuel delivery). There is opportunity for fueling car hailing and delivery fleets in a more cost effective way to boost profit through cost reduction and improved up-time.

Conventional vehicle usages involve more spontaneously planned/random trips. Car hailing vehicles typically will have at least several planned trips ahead of time such that preview and planning activities are more feasible. Furthermore, many vehicle manufacturers are indulging in big data efforts that model customer drive patterns and behaviors. Hence this a priori knowledge of future and predicted planned trips is valuable data that can be used intelligently to project and execute future fueling needs for a programmable usage horizon. Currently, no systems and/or methods are capable of intelligently creating routes for vehicles, which are used to navigate the vehicle in a manner that reduces overall fuel consumption (or complies with another AV operation goal). Some or all of the above needs and/or problems may be addressed by certain embodiments disclosed herein.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
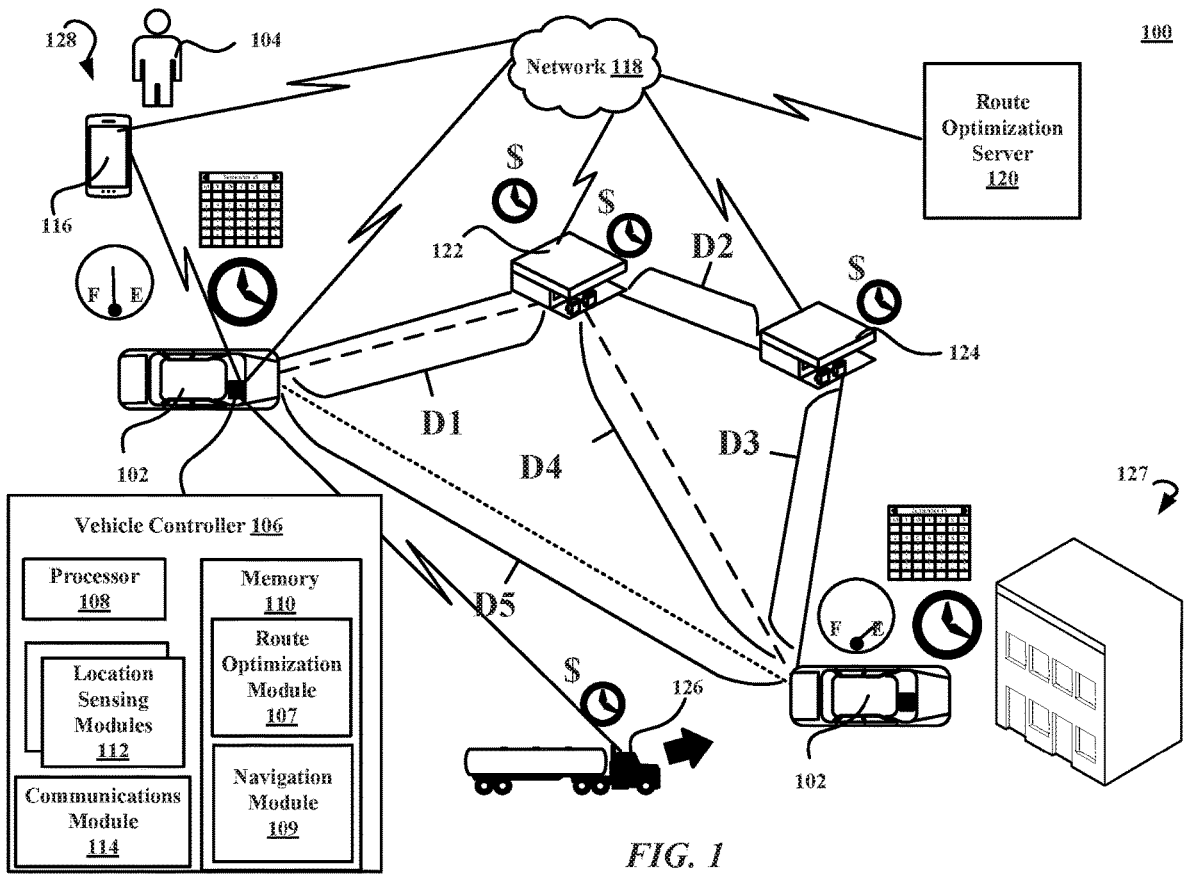
FIG. 1 depicts a generalized environment for practicing aspects of the present disclosure.

In general, the present disclosure is directed to systems and methods of intelligent or opportunistic vehicle fueling. Broadly, the present disclosure may involve the analysis of a trip schedule for a vehicle (which can comprise an AV), evaluation of fueling options based on the trip schedule, and generation of an optimized route that comprises at least one fueling option that was selected based on the application of vehicle fueling constraints. The vehicle fueling constraints can be based on fueling parameters of the vehicle such as tank size or fuel type, and/or fueling option parameters that are descriptive of, for example, fuel type(s) available, fuel price(s), wait time(s), and so forth. Thus, some vehicle fueling constraints are controlled by attributes of the vehicle, while other vehicle fueling constraints are related to attributes of the fueling options available. These two types of general categories of attributes/parameters are referred to as the vehicle fueling constraints.

Practically speaking, as a car hailing vehicle may be projected to accrue hundreds of miles daily, it may need to refuel regularly and/or keep the fuel topped off at high fill levels. A car hailing vehicle may know ahead what trips are planned for the day or its schedule may be filled up dynamically during the day. As the car hailing vehicle drives around, it may monitor its fuel level and distance-to-empty (additional vehicle fueling constraints which are attributes of the vehicle), and how its drive cycle (city and/or highway) impacts fuel economy.

The systems and methods herein can also be configured to utilize additional factors such as distances between nearest gas stations and future destinations, presence of/to a mobile fueling truck at future destinations (referred to as opportunistic fueling), wait time at gas stations of near future destinations, idle time between reservations (e.g., free time to refuel), availability of fuel type of gasoline near future destinations (e.g., E10, E85, Diesel—just to name a few). The systems and methods can also allow for the imposition of overriding conditions such as a high revenue potential, such as a customer willing to pay for on-time pickup/delivery. In these instances, the vehicle may prioritize high revenue over other considerations such as fuel cost if the customer is willing to accept a higher than average price for service.

These systems and methods may provide a smart preview method for determining a next destination in a trip schedule and the determination of a list of nearby or on-the-way fueling opportunities. Again, the systems methods can consider vehicle fueling constraints such as idling time (non-profit generation) and utilize mixed-integer programming to evaluate all alternatives in order to project optimal fueling strategies, determine where to fuel, and how much to fuel to obtain at any given fueling option.

The systems and methods disclosed herein may provide a systematic approach to boost AV hailing service profit, provide optimal fueling strategies to accommodate varying profit generating capabilities throughout the day at different areas, leverage enhanced level of queueing information at fueling locations and on-demand fueling services, and provide a public/commercial solver for mixed integer linera programming problem (MILP) include the following Gurobi™ and CPLEX™. Additional details are provided in the descriptions below with reference to the collective drawings.

Illustrative Architecture

Turning now to the drawings, FIG. 1 depicts an illustrative architecture 100 in which techniques and structures for providing the systems and methods disclosed herein may be implemented. The illustrative architecture 100 may include an autonomous vehicle (AV) 102 that is configured to transport a rider 104 along an optimized route. As noted above, the AV 102 can include a legacy vehicle with a navigation component. In general, the AV 102 is configured generally to transport the rider 104 from one location to another according to a trip schedule that is maintained by a control and navigation unit 106 of the AV 102. In general, the control and navigation unit 106 comprises a processor 108, memory 110, location sensing modules 112, and a communications module 114, for example. The processor 108 is configured to execute instructions stored in memory to perform methods of vehicle automation and navigation related to intelligent vehicle fueling. More specific configuration details are disclosed in greater detail infra. In some embodiments, the location sensing modules 112 can include GPS, cellular, or other similar hardware and/or software that are used to sense a position of the AV 102. In various embodiments, the communications module 114 can be used to allow the AV 102 to bi-directionally communicate with the rider 104 and their mobile device 116 over a network 118. The communications module 114 also allows the AV 102 to communicate bi-directionally with one or more fueling options such as gas stations and/or mobile fueling options.

The network 118 may include any one or a combination of multiple different types of networks, such as cable networks, the Internet, wireless networks, and other private and/or public networks. In some instances, the network 118 may include Bluetooth, cellular, near-field communication (NFC), Wi-Fi, or Wi-Fi direct. In some embodiments, the network 118 includes a device-to-device communication over a short range wireless connection.

In some embodiments, rather than requiring the AV 102 to analyze data and calculate an optimal route, a route optimization server 120 can be implemented. In some instances, the AV 102 and route optimization server 120 can share aspects of optimal route determination and/or selection. For example, the AV 102 can maintain a trip schedule and communicate with riders, whereas the route optimization server 120 can be used to collect fueling options parameters such as current fuel costs, wait times, mobile fueling attributes, and so forth. The optimal route determination can be made by the AV 102 or the route optimization server 120. Again, this is merely an example division of operations. In some embodiments, the route optimization server 120 can perform all or a portion of the route optimization processes disclosed herein. This is advantageous in vehicles that possess limited computational capacity or mechanisms. In other embodiments, the AV 102 can be configured to perform all or a portion of the route optimization processes disclosed herein.

The environment depicted in FIG. 1 illustrates three potential fueling options. A first fueling option 122 and a second fueling option 124 each include a gas station. A third fueling option 126 includes a mobile fueling truck that can deliver fuel to the AV 102 as desired.

For context, it will be assumed that the AV 102 will pick up the rider 104 and deliver the rider 104 to a final destination 127. The transportation of the rider 104 from a pickup location 128 to a final destination 127 is referred to as a trip schedule. Each of the fueling options 122, 124, and 126 are available to the AV 102 after picking up the rider 104. The rider 104 can request use of the AV 102 through a ride-sharing application or any other means that would be known to one of ordinary skill in the art. The ride sharing application can also provide the AV 102 with the required information to calculate possible routes between the pickup location 128 and the final destination 127. Also, although not disclosed in regard to this specific example, the AV 102 can also consider fueling options that may be present on the way to pick up the rider 104. Also, as noted above, these methods are employable outside the confines of a ride-sharing scenario and can be used in vehicles that are capable of navigation, or even through use of an application that can execute on a mobile device. In general, the opportunistic/intelligent fueling capabilities disclosed herein are not strictly limited by native vehicle capabilities.

For purposes of complete description, the AV 102 can transport the rider 104 from the pickup location 128 to the final destination 127 using several possible routes. A first potential route includes traversing from the pickup location 128 to the fueling option 122 and then to the final destination 127, which in terms of distance is the sum of D1 and D4. A second potential route includes traversing from the pickup location 128 to the fueling option 122, continuing to the fueling option 124, and then to the final destination 127, which in terms of distance is the sum of D1, D2, and D3. A third potential route includes traversing from the pickup location 128 directly to the final destination 127, which in terms of distance is equal to D5. While the third potential route is an option, in order to prevent obscuring the salient features of the present disclosure with respect to selecting fueling options, only the first and second potential routes will be discussed.

Generally, aspects of the AV 102 are defined in terms of the trip schedule it maintains, in view of various vehicle fueling constraints that are tied to the AV 102. For example, vehicle fueling constraints would include a fuel tank size, an average (or real-time) fuel consumption rate, acceptable fuel types, and so forth.

Each of the fueling options 122, 124, and 126 can be defined in terms of fueling option attributes such as fuel type(s) available, fuel cost(s), and wait times, which defines how long customers are waiting in line to obtain fuel. With respect to the third fueling option 126, the mobile fuel delivery service is defined by a wait time, but this wait time refers to how long it will take for the mobile fuel delivery service to reach the AV 102, rather than a wait time as discussed with regard to fueling options 122 and 124. In some instances, the wait time can be zero if the mobile fuel delivery service is scheduled to meet with the AV 102 at a point along the optimized route or at a destination.

Illustrative Processes

With respect to the example architecture/environment provided above, implementational details regarding which fueling option(s) are to be selected to obtain fuel, how much fuel to obtain, and so forth are described in greater detail below. To be sure, an optimal route is defined, in one embodiment, as one of a plurality of potential routes that is selected so as to allow the AV to complete a trip schedule with a lowest possible fuel acquisition cost. That is, assuming that fuel will be obtained, which possible route ensures that a rider is delivered to their intended destination while allowing the AV to attain a lowest possible fuel acquisition cost (notwithstanding overriding conditions that will also be discussed).

In general, determining an optimized route for an AV is described at its highest level as an optimization problem. In any optimization problem, constraint functions may be applied to ensure that only the most optimal scenario is selected. In terms of this disclosure, the constraints may be selected to ensure that an optimal route is selected. Again, the optimization of the route is defined in terms of attaining a lowest possible fuel acquisition cost in some instances, while in other embodiments other optimization goals can be used.

In some embodiments, example constraints can be used to ensure that an amount of fuel that is obtained at a fueling station is zero if it is determined that the AV should not stop at the fueling station. Also, it will be assumed that only one scenario (e.g., potential route) is chosen. In some embodiments, other constraints such as minimum/maximum values can be used. For example, a buffer volume of fuel (an amount of fuel in the fuel tank below which the AV should not be operated) can be maintained and/or that the AV should not obtain more fuel that can be stored in the fuel tank of the AV. Another example minimum/maximum values constraint could include ensuring a wait time is limited to a maximum of ten minutes, which prevents excessive idle time.

The optimization problem may also be defined in terms of decision variables. With respect to this disclosure, the decision variables can include the vehicle fueling parameters that relate to attributes/parameters of the AV and/or the fueling options. To be sure, one or more of these decision variables can have an associated negative or positive cost associated therewith. For example, the AV, based on its trip schedule can have wait time(s) and free time(s) that are collectively referred to as idle time(s). Idle time can also include average pickup or loading time for a passenger/rider. A wait time can refer to a time spent waiting for a rider and/or time waiting for fuel. Free time can include time between rider events. For example, after dropping off a first rider at a destination, the AV may have thirty minutes until it must pick up a second rider. Idle time when the engine of the AV is running is considered a negative cost, whereas idle time when the AV engine is not operating is potentially cost neutral.

Other variables may include fuel cost, fueling time, and driving distance, which impacts both trip schedule and fuel consumption. According to some embodiments, additional variables include potential income for picking up a customer at a given location for transportation to a destination. Again, each of these has either a negative or positive cost.

In broad terms, negative costs may include resources (fuel amount/type) and cost related variables are minimized in a minimization problem, while income/gain variables may be maximized in the minimization problem.

An example objective function in terms of a minimization equation includes min:$\Sigma F(i)*p(i)+Ct(\Sigma G(i)*wt(i))-Ft)+Cd(j)(\Sigma Route(j)*d(j))-I(k)\Sigma Income(k)$. In this example minimization equation, a sum of fuel to obtain at a selected fueling option $F(i)$ is multiplied by $P(i)$, which is the price of fuel at a given fueling option. With regard to variables that impact cost, $Ct$ is a negative cost associated with time related parameters or variables, which includes a calculation of wait times $wt(i)$ at one or more fueling options, $G(i)$, and fueling time $Ft$ that is indicative of the time needed to obtain the amount of fuel needed at $G(i)$. Another negative cost is related to driving distance $Cd(j)$, with $d(j)$ representing a driving distance for different route choices. In general, a route is indicated by variable $j$. Each route $j$ will have its own unique associated costs such as driving distance $d(j)$.

In some embodiments, the method includes associating a potential route variable with route dependent variables. For example, each route can be further evaluated in terms of driving distance $d(j)$ as each distance will cause a proportional increase in fuel consumption and cost. The variable $I(k)$ is indicative of destinations (e.g., stops to make based on the first trip schedule), which represent positive cost. Income (k) represents another positive cost parameter that represents potential income from picking up a customer/rider at a location $I(k)$.

It will be understood that some variables in the objective function may require constraining, which would prevent them from being evaluated as unlimited and thus producing erroneous values. Moreover, some variables (vehicle fueling parameters) may be related to one another. By way of example, an amount of fuel to put into the AV and which fueling option that is selected are clearly related to one another. In one example constraint formulation, $K*G(i)-F(i)\geq 0$, K is a maximum tank size of the AV, $G(i)$ is the selected fueling option, and $F(i)$ is the amount of fuel to obtain at the selected fueling option. In this example, a physical limitation of the maximum tank size is used to tie two continuous and binary variables that are related to one another (e.g., fueling option and amount of fuel to obtain at the fueling option).

In another example, route alternatives (variable j) may be related in the sense that only one of the alternative will occur while the others will not. That is, Z Route(j) may equal 1. Moreover, since these are binary variables it ensures that only one alternative will be true.

In one or more embodiments, the systems and methods of the present disclosure can simplify the variables considered by way of pre-filtering. For example, one or more of the fueling options can be removed from consideration by filtering based on vehicle fueling constraints. By way of example, if a fueling station does not have fuel types that match those required by the AV the fueling station is filtered out.

In general, effective pre-processing/filtering of data may be used to reduce a total number of variables and greatly reduce the complexity of an objective analysis. For example, a number of gas stations can be taken into consideration in terms of fuel price, fueling time, proximity to routes, total fueling time, and so forth. In practice, this filtering significantly reduces computation time which is important for mixed integer/continuous variable programming problems. Indeed, efficiencies are created by limiting a total of number of variables utilized by the system to solve the optimization problem.

In an example use case, the systems and methods herein can obtain data in real or near-real time regarding fueling options from various resources. In some embodiments, this comprises (crowd-sourced) content for gas stations regarding fuel types and fuel prices (some have both cash and credit prices)—just as an example. To be sure, some data can be obtained through crowd-souring or repeated, direct observation by a host vehicle (e.g., a vehicle adapted in accordance with the present disclosure). An example of data obtained by the vehicle through periodic or repeated direct observation includes a rate of fueling (measured in gallons per minute), which may influence fueling time and such data may be more accurate when obtained in this fashion.

The methodology disclosed herein can utilize the trip schedule to identify potential fueling options. For example, the trip schedule can identify a current AV location and next rider pickup location, candidate routes (if no stop is to be made) to obtain a list of gas stations that are within a predefined distance of one or more of these locations.

A filtering procedure can be implemented such that a few candidate stations can be narrowed down to those which are: (1) within short distance from default route; (2) have relative lower fuel prices; and (3) at least one type of compatible fuel available, or some permutation of combination thereof. Again, the filtering process reduces the amount of gas stations to be considered in the main procedure which will result in faster response due to reduced solving time. Also, it will be understood that the process of pre-filtering is an optional component and is not required in all embodiments.

Another component of vehicle fueling constraints is referred to as resource constraints, which are also utilized in the objective function. Some resources require more than one variable to describe completely, In instances where multiple variables are utilized to describe resources, in order provide a more complete analysis, the multiple variables can be described completely to ensure that any outcome/optimized solution is feasible in real-life application(s). That is, as the complexity of the problem increases due to resources being described in greater detail, more tailored solutions can also be offered. Thus, as the parameters or variables of the resources are more fully defined, more detailed solutions can be offered. As an example, if the only fuel related variable known is price, such information is valuable but less granular than knowing fuel price, fuel type(s), and wait times at a given fueling option.

In one example, a cost can be calculated in terms of both fixed and variable costs. Variables for analyzing resource costs can take many forms such as binary variables which represent a binary choice, continuous variables that indicate usage, and aggregate resource usage. With respect to continuous variables, fueling options can include an analysis of how long it takes to refuel at the fueling option (pump wait time and fueling time), as well as an amount of fuel to obtain at this fueling station.

The present disclosure can aggregate resource usage (in this disclosure related to fuel) according to an associated price and can prevent the overutilization of the resource by associating a resource use violation with extremely high price or manipulate utilization (amount of fuel obtained) using constraints.

Figure 2:
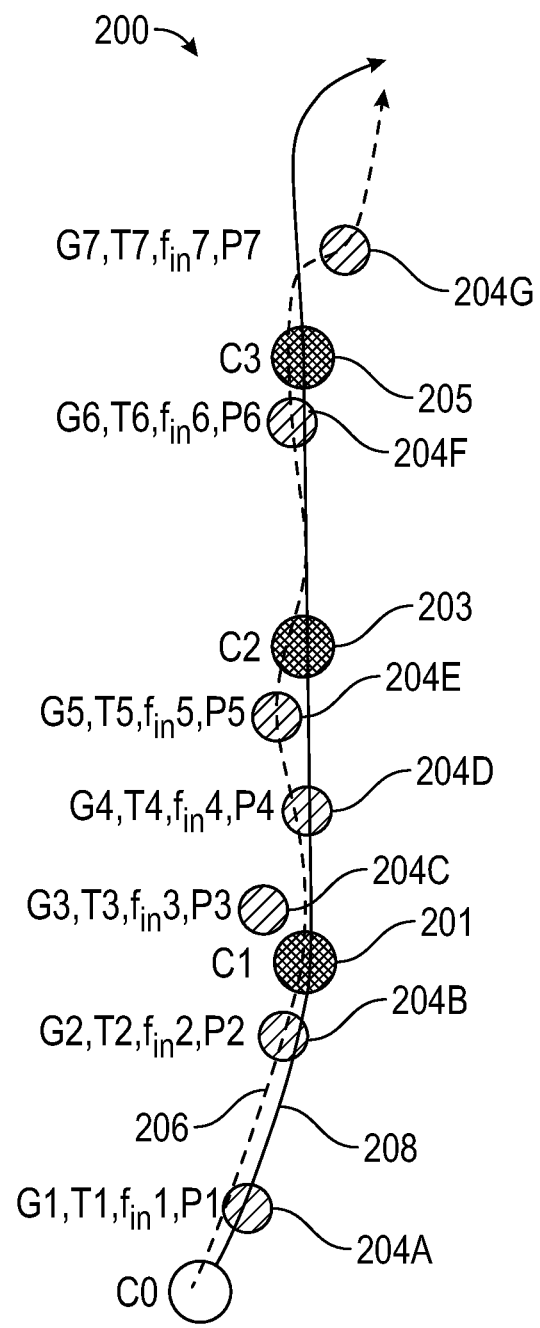
FIG. 2 schematically illustrates the selection of an optimized route from a plurality of potential routes.

In view of the above, the following descriptions provide example calculations and schemas for determining optimized route(s). FIG. 2 illustrates an example driving route schematic 200 having a plurality of potential routes for an AV. An initial position C0 is a current location of an AV. A plurality of destinations C1, C2, and C3 are also illustrated. Each smaller circular object is illustrative of a fueling option 204A-204G such as a gas station. In this example, two possible routes are calculated, a first route 206 and a second route 208. To determine which route is the optimal route, an evaluation of fueling options in view of a trip schedule (informed by vehicle fueling constraints) is performed. To be sure, each fueling station/option is associated with a set of fueling option parameters. For example, fueling option 204A comprises a fueling option identifier G1, an idle/wait time T1, a fuel to be added $F_{in}$, an offset value of 1, and a P1, where P1 is an example p(i) value referenced in minimization function above. In this example, P1 is the price of fuel at a given fueling option G1.

As noted herein, a decision can be made as to whether to use a mobile fueling option versus a fixed location fueling option. In the minimization equation above, the wait time wt(i) variable is defined to be associated with wait time and fueling time. As a result these variables should be related to an amount of fuel to obtain in at a particular gas station and additional wait times defined according to the example constraining function wt(i)=F(i)*ft(i)+G(i)*lt(i), where in this example wt(i) is a combination of a wait time and a fueling time, ft(i) fueling time per unit, and lt(i) represents an offset that include time spent to obtain fuel at the selected fueling option. For mobile fueling services, the term lt(i) may be much shorter than a traditional gas station. Also, these variables may be obtained and/or estimated (historical or crowd-sourced) as known parameters.

An example formulation can be used that will tie a decision as to whether to fuel at a given fueling option with a fueling amount, and an idle/wait time. A formulation can be used to represent this relationship: $K*G(i)-f_{in}(i) \geq 0$, where K is the maximum tank size of the AV, and an offset i is selected that can be of any value from one to seven. The offset includes an amount of fuel currently in the AV. To be sure, $f_{in}$ can take value only when G1 takes a value. That is, the amount of fuel to obtain is only relevant if a decision has been made to stop at a given fueling station. The formulation ties G(i) and $f_{in}$ (i) such that $f_{in}$ (i) will take value only if G(i) is 1. Another constraint can be used to ensure that fuel to put in does not exceed a maximum tank size of the AV.

In another example, a formulation can be used that will tie a decision as to whether to fuel at a given fueling option with a fueling amount in view of a max idle time of an AV. In this formulation, $M*G(i)-T(i) \geq 0$, where M is the max idle time of the AV plus some offset i is selected that can be of any value from one to seven. The offset includes an amount of fuel currently in the AV. The methodology can also implement another constraint that ensures that a maximum allowed time for fueling is not exceeded. In one example, the AV can maintain a buffer volume of fuel of three gallons. Thus, if ten gallons is required to ensure that the AV completes the trip schedule, the AV can obtain thirteen gallons of fuel to ensure the buffer volume of fuel is present when the trip schedule is completed. In general, these constraining functions are utilized to constrain the objective function represented in the minimization equation disclosed above.

As noted above, more than one possible route exists. For purposes of clarity and brevity, aspects of alternate route selection will be described considering the first route 206 and the second route 208 only between points C0 and C1. To be sure, the logic disclosed herein can be used equally to evaluate more complex potential routes extending along more complicated paths.

Generally, there are four possible routes to go from C0 to C1 as G1 and G2 are the only possible stops for fueling. A first option includes not stopping for fuel: $X_{C0C1}$, stopping for fuel at G1 $X_{C0G1C1}$, stopping for fuel at G2 $X_{C0G2C1}$ and stopping for fuel at G1 and G2 $X_{C0G1G2C1}$.

In general, the sum of the options $X_{C0C1}+X_{C0G1C1}+X_{C0G2C1}+X_{C0G1G2C1}=1$. Route alternatives can be calculated using Table 1 and the following formulation(s): $1 \geq 2*X_{C0C1}+G1+G2 \leq 2$; and a tie between $X_{C0C1}$ to G1 and G2. When $X_{C0C1}$ is 0, at least one of G1 or G2 has to be selected. When $X_{C0C1}$ is 1, both of G1 or G2 has to be 0.

TABLE 1

| $X_{C0C1}$ | G1 | G2 |
|---|---|---|
| 0 | 1 | 0 |
| 0 | 0 | 1 |
| 0 | 1 | 1 |
| 1 | 0 | 0 |

TABLE 2

| $X_{C0G1G2C1}$ | G1 | G2 |
|---|---|---|
| 0 | 0 | 0 |
| 0 | 0 | 1 |
| 0 | 1 | 0 |
| 1 | 1 | 1 |

Also, the route alternatives are further analyzed using Table 2 and the formulation: $-1 \geq 2*X_{C0G1G2C1}-(G1+G2) \leq 0$, where a tie is created for $X_{C0G1G2C1}$ to G1 and G2. In this example, when $X_{C0G1G2}C1$ is 0, G1 or G2 cannot take the value of 1 simultaneously. Also, when $X_{C0G1G2C1}$ is 1, both G1 or G2 is equal to 1. With the above established it can be determined that $X_{C0G1C11}-G1 \leq 0$; $X_{C0G1C1}+G1+G2 \leq 2$; $X_{C0G2C1}-G2 \leq 0$; and $X_{C0G2C1}+G1+G2 \leq 2$.

Another example calculation can be performed using X to define a required fuel level when arriving at a destination, which in this instance is C1. Thus, rather than maximizing cost, the algorithm is tuned to ensure that a required fuel level (such as a buffer fuel level or volume) is achieved when a trip schedule is completed (or a destination of a trip schedule is completed). In this example, the following variables are defined $F_{lvl}(C0)$: Fuel level at C0 at start; and Flvl_remainder (C1): required fuel level arriving at C1. $X_{C0C1}$, $X_{C0G1C1}$, $X_{C0G1G2C1}$, $X_{C0G2C1}$ are binary variables indicating how the AV moved from C0 to C1 and if fueling occurred. FC(C0C1), FC(C0G1C1), FC(C0G1G2C1), FC(C0G2C1) are fuel consumption values for each possible route.

Fuel level at C1 in all four possible scenarios includes: $X_{C0C1}=1$: Flvl(C1)=Flvl(C0)−FC(C0C1); $X_{C0G1C1}=1$: Flvl(C1)=Flvl(C0)−FC(C0G1C1)+$F_{in}1$; $X_{C0G2C1}=1$: Flvl(C1)=Flvl(C0)−FC(C0G2C1)+$F_{in}2$; and $X_{C0G1G2C1}=1$: Flvl(C1)=Flvl(C0)−FC(C0G1G2C1)+$F_{in}1$+$F_{in}2$. Thus, the expected fuel level at Flvl(C1) is defined as: $X_{C0C1}$*Flvl_remainder($X_{C0C1}$)+$X_{C0G1C1}$*Flvl_remainder($X_{C0G1C1}$)+$X_{C0G2C1}$*Flvl_remainder($X_{C0G021C1}$)+ $X_{C0G1G2C1}$*Flvl_remainder($X_{C0G1G2C1}$)≥Flvl_remainder (C1).

Thus, routes can be optimally selected to not only ensure that a lowest fuel acquisition cost is found, but other goals can be utilized such as ensuring a buffer level of fuel remains after a trip is complete, and so forth.

Figure 3:
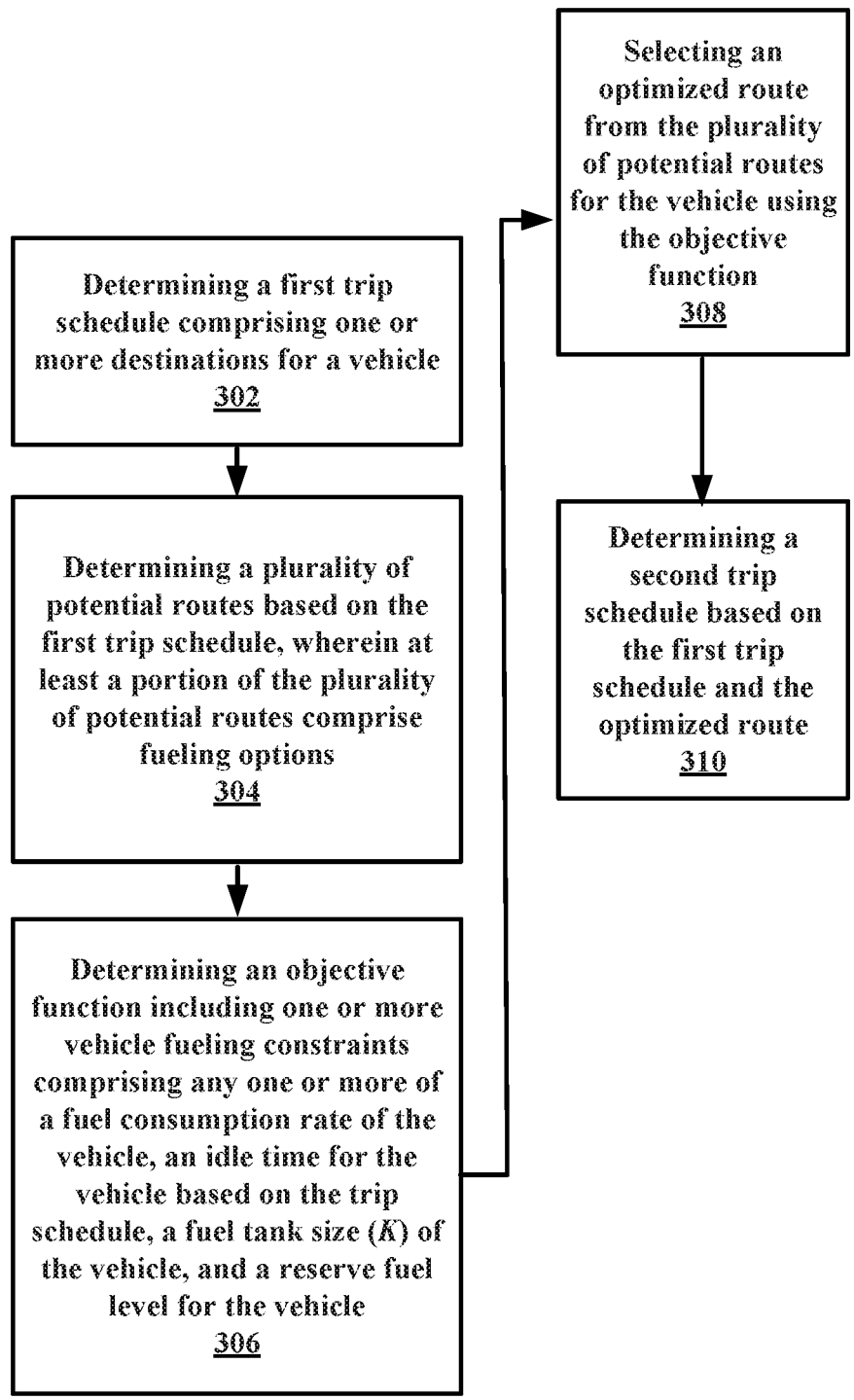
FIG. 3 is a flowchart of an example method of the present disclosure.

FIG. 3 is an example flowchart of a method of the present disclosure. The method comprises a step 302 of evaluating a trip schedule comprising one or more destinations for a vehicle. For example, this can include evaluating a current location of a vehicle as well as pickup and drop off destinations for passengers in the vehicle.

Once the trip schedule is parsed and analyzed, the method includes a step 304 of calculating a plurality of potential routes based on the trip schedule. This can include calculating various routes that if followed cause the vehicle to arrive at a given destination through different routes of transit (see FIG. 2 for examples). To be sure, at least a portion of the plurality of potential routes comprise fueling options along a proposed path of travel for the vehicle. Again, one of the fueling options can include a mobile fuel delivery service that is selected when remaining fueling options are not viable options but fueling is necessary. In some embodiments, the selection of a route can be guided based on locations of fueling options rather than using the most direct route if no fueling options are available along the most direct route.

In order to determine which of the plurality of potential routes is the most optimal, the method can include a step 306 of applying one or more vehicle fueling constraints. In some embodiments, the vehicle fueling constraints comprise any one or more of a fuel consumption rate of the vehicle, an idle time for the vehicle based on the trip schedule, a fuel tank size (K) of the vehicle, and a reserve fuel level for the vehicle.

In some embodiments, the vehicle fueling constraints are evaluated relative to an optimization goal. For example, the optimization goal can include ensuring a lowest possible fuel acquisition cost when completing the trip schedule. In sum, the trip schedule is completed while onboarding fuel at a cheapest possible cost, which could include purchasing inexpensive fuel, purchasing only limited amounts of fuel at one fueling option and then purchasing more fuel at another fueling option which hosts cheaper fuel. Again, this is can be constrained by the time frames provided in the trip schedule. The trip schedule can also provide indicated time frames where fueling is advantageous. For example, gaps between passenger trips or other idle time can be used for fueling without causing major impacts to overall profitability. In another example embodiment, the optimization goal could include ensuring that a buffer level of fuel is present in the vehicle when a trip is complete. In other embodiments, multiple optimization goals can be implemented. In sum, step 306 includes applying one or more vehicle fueling constraints that are to be utilized with an objective function that is configured according to an optimization goal.

Next, the method includes a step 308 of selecting an optimized route from the plurality of potential routes for the vehicle using the one or more vehicle fueling constraints. In various embodiments, the optimized route is calculated using an objective function that includes various constraints, conditions, and variables such as binary variables and continuous variables. This step can include programming or reprogramming a control and navigation unit of a vehicle with the optimized route.

In selecting the optimized route is performed using an objective function that evaluates an combination of: (a) whether to obtain the fuel at the selected fueling option of the plurality of fueling options, G(i); (b) how much of the fuel to obtain at the selected fueling option, F(i); (c) the potential route of the plurality of potential routes associated with the selected fueling option, j; and (d) selections of at least one of the one or more destinations, I(k). It will be understood that each of a-d is associated with a positive or a negative cost and the objective function utilizes a-d to maximize profit based on each positive or negative cost. In some embodiments, the method includes a step 310 of completing the trip schedule using the optimized route.

As noted herein, the method can include an optional process of filtering the fueling options by a comparison process. The comparison evaluates any of a distance from the one or more destinations of the trip schedule, a fuel price of the fuel of the fueling options, and/or a fuel type of the fuel at the fueling options. These values are compared to the trip schedule and the one or more vehicle fueling constraints. To be sure, any of the plurality of fueling options that do not correspond to the trip schedule or the one or more vehicle fueling constraints are automatically removed.

In some embodiments, the fueling options are each defined by fueling option parameters comprising at least one of a fuel price, fuel types, a wait time to obtain fuel, or a distance between the vehicle and the selected fueling option.

In one or more embodiments, the fueling option parameters are located in real-time allowing the optimized route to be selected in real-time.

As noted above, the optimized route can be selected based on detection of an overriding condition. The overriding condition comprises an indication that a rider will pay a fuel surcharge. Thus, if the optimization goal is cost savings, if a rider is willing to pay a surcharge for the ride service to offset the cost savings lost by completing the trip, this indication can override the process.

Figure 4:
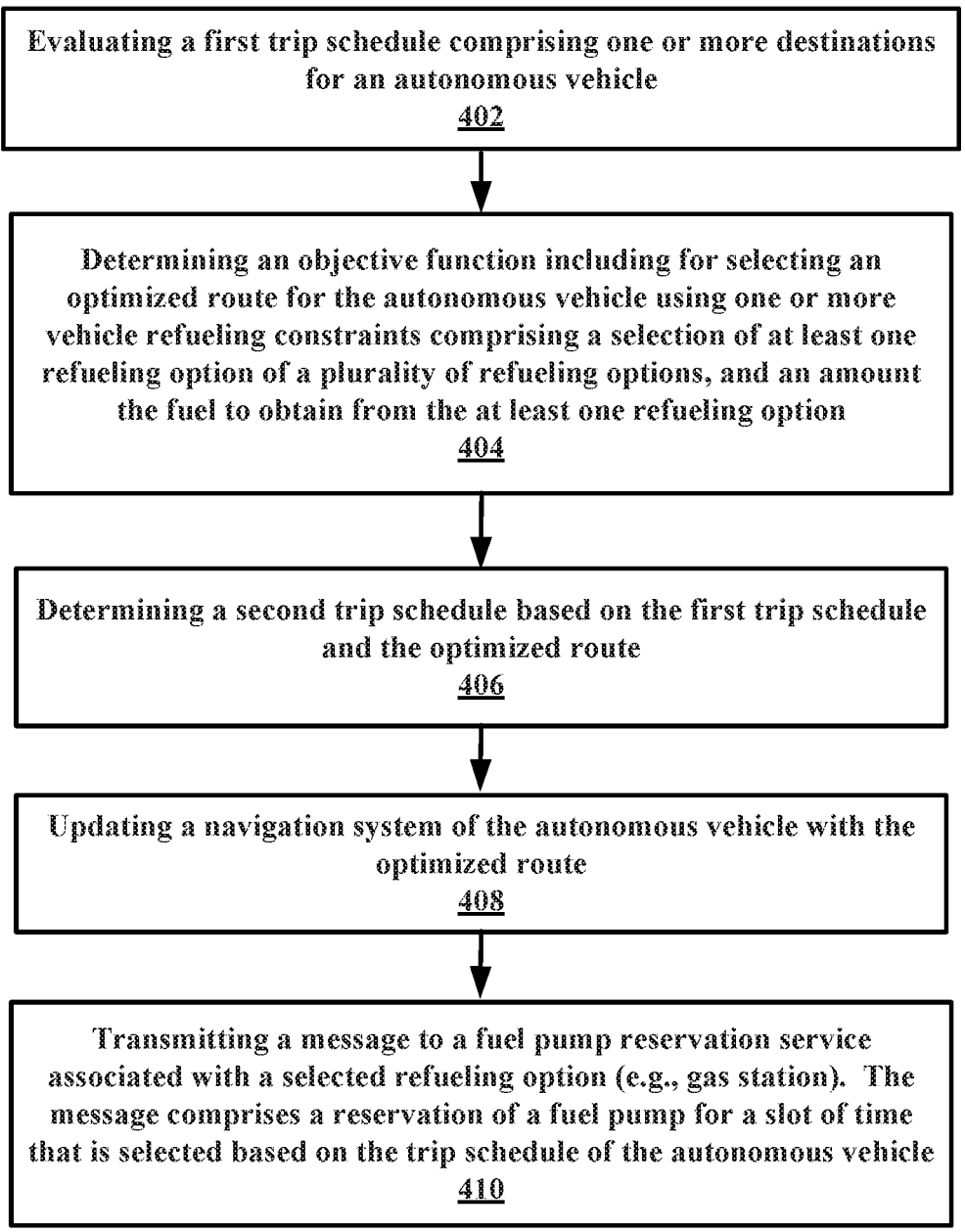
FIG. 4 is a flowchart of another example method of the present disclosure.

FIG. 4 illustrates another flowchart of an example method. In general, the method comprises a step 402 of evaluating a trip schedule comprising one or more destinations for an autonomous vehicle. It will be understood that the trip schedule requires the autonomous vehicle to obtain fuel at least one time between the one or more destinations.

Next, the method comprises a step 404 of generating an optimized route for the autonomous vehicle using one or more vehicle fueling constraints. The optimized route comprises a selection of at least one fueling option of a plurality of fueling options, and an amount the fuel to obtain from the at least one fueling option. It will be further understood that the optimized route is constructed so as to allow the autonomous vehicle to complete the trip schedule with a lowest possible fuel acquisition cost. In one or more embodiments, when the optimized route is selected, the method includes a step 406 of updating a navigation system of the autonomous vehicle with the optimized route.

In one or more embodiments, the method can include a step 408 of transmitting a message to a fuel pump reservation service associated with a selected fueling option (e.g., gas station). The message comprises a reservation of a fuel pump for a slot of time that is selected based on the trip schedule of the autonomous vehicle.

EXAMPLE EMBODIMENTS

Example 1 may include a method, comprising: determining a first trip schedule comprising one or more destinations for a vehicle; determining a plurality of potential routes based on the first trip schedule, wherein at least a portion of the plurality of potential routes comprise fueling options along a proposed path of travel for the vehicle; determining an objective function including one or more vehicle fueling constraints comprising any one or more of a fuel consumption rate of the vehicle, an idle time for the vehicle based on the trip schedule, a fuel tank size (K) of the vehicle, and a reserve fuel level for the vehicle, selecting an optimized route from the plurality of potential routes for the vehicle using the objective function; and determining a second trip schedule based on the first trip schedule and the optimized route.

Example 2 may include the method according to example 1, further comprising filtering the fueling options by comparing any of: a distance from the one or more destinations of the trip schedule; a fuel price of the fuel of the fueling options; or a fuel type of the fuel at the fueling options, to the trip schedule and the one or more vehicle fueling constraints, wherein any of the plurality of fueling options that do not correspond to the trip schedule or the one or more vehicle fueling constraints are automatically removed.

Example 3 may include the method according to example 1 and/or some other example herein, wherein a first fueling option of the fueling options comprises at least one of a fuel price, fuel types, a wait time to obtain fuel, or a distance between the vehicle and the selected fueling option.

Example 4 may include the method according to example 3 and/or some other example herein, further comprising obtaining the fueling option parameters in real-time.

Example 5 may include the method according to example 1 and/or some other example herein, further comprising filtering the fueling options based on the one or more vehicle fueling constraints.

Example 6 may include the method according to example 1 and/or some other example herein, wherein each of the one or more destinations is associated with an arrival time.

Example 7 may include the method according to example 1 and/or some other example herein, wherein one of the fueling options comprises a mobile fuel delivery service that is selected when remaining fueling options do not comply with the one or more vehicle fueling constraints.

Example 8 may include the method according to example 1 and/or some other example herein, wherein selecting the optimized route includes detecting an overriding condition, the overriding condition comprising an indication that a rider will pay a fuel surcharge.

Example 9 may include the method according to example 1 and/or some other example herein, wherein the objective function evaluates: (a) whether to obtain the fuel at the selected fueling option of the plurality of fueling options, G(i); (b) how much of the fuel to obtain at the selected fueling option, F(i); (c) the potential route of the plurality of potential routes associated with the selected fueling option, j; and (d) selections of at least one of the one or more destinations, I(k); and wherein each of a-d is associated with a positive or a negative cost and the objective function utilizes a-d to maximize profit based on each positive or negative cost.

Example 10 may include the method according to example 9 and/or some other example herein, wherein the objective function is constrained according to K*G(i)−Fin(i)≥0 when using the fuel tank size (K) of the vehicle.

Example 11 may include the method according to example 10 and/or some other example herein, wherein the objective function is further constrained according to Wt(i)=F(i)*ft(i)+G(i)*lt(i), where Wt(i) is a combination of a wait time and a fueling time, ft(i) fueling time per unit, wherein lt(i) represents an offset that include time spent to obtain fuel at the selected fueling option.

Example 12 may include the method according to example 11 and/or some other example herein, whereinft(i) and lt(i) are obtained from a crowdsourced resource.

Example 13 may include the method according to example 11 and/or some other example herein, wherein the determination as to whether to refuel at the selected fueling option is determined relative to at least one of a tank size K or a maximum idle time T(i).

Example 14 may include an autonomous vehicle, comprising: a control and navigation unit configured to: evaluate a trip schedule comprising one or more destinations for an autonomous vehicle, the trip schedule requiring the autonomous vehicle to obtain fuel at least one time between the one or more destinations using at least one fueling option; select an optimized route for the autonomous vehicle using one or more vehicle fueling constraints to select the at least one fueling option and an amount of the fuel to obtain from the at least one fueling option, the optimized route being selected so as to allow the autonomous vehicle to complete the trip schedule with a lowest possible fuel acquisition cost; and complete the trip schedule using the optimized route.

Example 15 may include the autonomous vehicle according to example 14, wherein the one or more vehicle fueling constraints comprise autonomous vehicle idle time based on the trip schedule and a wait time to obtain the fuel at the at least one fueling option.

Example 16 may include the autonomous vehicle according to example 14 and/or some other example herein, wherein the control and navigation unit is further configured to override the optimized route when a rider is willing to pay a fuel surcharge.

Example 17 may include a method, comprising: evaluating a trip schedule comprising one or more destinations for an autonomous vehicle, the trip schedule requiring the autonomous vehicle to obtain fuel at least one time between the one or more destinations; generating an optimized route for the autonomous vehicle using one or more vehicle fueling constraints, the optimized route comprising a selection of at least one fueling option of a plurality of fueling options, and an amount the fuel to obtain from the at least one fueling option, the optimized route being constructed so as to allow the autonomous vehicle to complete the trip schedule with a lowest possible fuel acquisition cost; and updating a navigation system of the autonomous vehicle with the optimized route.

Example 18 may include the method according to example 17, further comprising filtering a plurality of fueling options based on any of: a distance from the one or more destinations of the trip schedule; a fuel price of the fuel the plurality of fueling options; and/or a fuel type of the fuel at the plurality of fueling options, wherein the plurality of fueling options that do not correspond to the trip schedule or the one or more vehicle fueling constraints are automatically removed.

Example 19 may include the method according to example 18 and/or some other example herein, wherein the plurality of fueling options are each defined by fueling option parameters comprising at least one of a fuel price, fuel types, a wait time to obtain fuel, or a distance between the autonomous vehicle and the fueling location.

Example 20 may include the method according to example 19 and/or some other example herein, further comprising reserving a fuel pump at the least one fueling option based on an arrival time of the autonomous vehicle as defined in the trip schedule.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
    determining a first trip schedule comprising one or more destinations for a vehicle;
    determining a plurality of potential routes based on the first trip schedule, wherein at least a portion of the plurality of potential routes comprise fueling options along a proposed path of travel for the vehicle;
    determining an objective function including one or more vehicle fueling constraints comprising any one or more of a fuel consumption rate of the vehicle, an idle time for the vehicle based on the trip schedule, a fuel tank size (K) of the vehicle, and a reserve fuel level for the vehicle,
    selecting an optimized route from the plurality of potential routes for the vehicle using the objective function, wherein the objective function evaluates:
        (a) whether to obtain the fuel at the selected fueling option of the plurality of fueling options, G(i);
        (b) how much of the fuel to obtain at the selected fueling option, F(i);
        (c) the potential route of the plurality of potential routes associated with the selected fueling option, j; and
        (d) selections of at least one of the one or more destinations, I(k); and
    wherein each of a-d is associated with a positive or a negative cost and the objective function utilizes a-d to maximize profit based on each positive or negative cost, and
    wherein the objective function is constrained according to $K*G(i)-F(i) \geq 0$ when using the fuel tank size (K) of the vehicle;
    determining a second trip schedule based on the first trip schedule and the optimized route; and
    providing a control and navigation unit of the vehicle with the optimized route.

2. The method according to claim 1, further comprising filtering the fueling options by comparing any of:
    a distance from the one or more destinations of the trip schedule;
    a fuel price of the fuel of the fueling options; or
    a fuel type of the fuel at the fueling options,
    to the trip schedule and the one or more vehicle fueling constraints, wherein any of the plurality of fueling options that do not correspond to the trip schedule or the one or more vehicle fueling constraints are automatically removed.

3. The method according to claim 1, wherein a first fueling option of the fueling options comprises at least one of a fuel price, fuel types, a wait time to obtain fuel, or a distance between the vehicle and the selected fueling option.

4. The method according to claim 3, further comprising obtaining the fueling options in real-time.

5. The method according to claim 1, further comprising filtering the fueling options based on the one or more vehicle fueling constraints.

6. The method according to claim 1, wherein each of the one or more destinations is associated with an arrival time.

7. The method according to claim 1, wherein one of the fueling options comprises a mobile fuel delivery service that is selected when remaining fueling options do not comply with the one or more vehicle fueling constraints.

8. The method according to claim 1, wherein selecting the optimized route includes detecting an overriding condition, the overriding condition comprising an indication that a rider will pay a fuel surcharge.

9. The method according to claim 1, wherein the objective function is further constrained according to $Wt(i)=F(i)*ft(i)+G(i)*lt(i)$, where $Wt(i)$ is a combination of a wait time and a fueling time, $ft(i)$ fueling time per unit, wherein $lt(i)$ represents an offset that include time spent to obtain fuel at the selected fueling option.

10. The method according to claim 9, wherein $ft(i)$ and $lt(i)$ are obtained from a crowdsourced resource.

11. The method according to claim 9, wherein the determination as to whether to refuel at the selected fueling option is determined relative to at least one of a tank size $K$ or a maximum idle time $T(i)$.

12. An autonomous vehicle, comprising:
a control and navigation unit configured to:
evaluate a trip schedule comprising one or more destinations for an autonomous vehicle, the trip schedule requiring the autonomous vehicle to obtain fuel at least one time between the one or more destinations using at least one fueling option;
select an optimized route for the autonomous vehicle using one or more vehicle fueling constraints to select the at least one fueling option and an amount of the fuel to obtain from the at least one fueling option, the optimized route being selected so as to allow the autonomous vehicle to complete the trip schedule with a lowest possible fuel acquisition cost, wherein generating the optimized route includes detecting an overriding condition, the overriding condition comprising an indication that a rider will pay a fuel surcharge; and
complete the trip schedule using the optimized route.

13. The autonomous vehicle according to claim 12, wherein the one or more vehicle fueling constraints comprise autonomous vehicle idle time based on the trip schedule and a wait time to obtain the fuel at the at least one fueling option.

14. The autonomous vehicle according to claim 12, wherein the control and navigation unit is further configured to override the optimized route when a rider is willing to pay a fuel surcharge.

15. A method, comprising:
evaluating a trip schedule comprising one or more destinations for an autonomous vehicle, the trip schedule requiring the autonomous vehicle to obtain fuel at least one time between the one or more destinations;
generating an optimized route for the autonomous vehicle using one or more vehicle fueling constraints, the optimized route comprising a selection of at least one fueling option of a plurality of fueling options, and an amount the fuel to obtain from the at least one fueling option, the optimized route being constructed so as to allow the autonomous vehicle to complete the trip schedule with a lowest possible fuel acquisition cost, wherein generating the optimized route includes detecting an overriding condition, the overriding condition comprising an indication that a rider will pay a fuel surcharge; and
updating a navigation system of the autonomous vehicle with the optimized route.

16. The method according to claim 15, further comprising filtering a plurality of fueling options based on any of:
a distance from the one or more destinations of the trip schedule;
a fuel price of the fuel the plurality of fueling options; and/or
a fuel type of the fuel at the plurality of fueling options, wherein the plurality of fueling options that do not correspond to the trip schedule or the one or more vehicle fueling constraints are automatically removed.

17. The method according to claim 16, wherein the plurality of fueling options are each defined by fueling option parameters comprising at least one of a fuel price, fuel types, a wait time to obtain fuel, or a distance between the autonomous vehicle and a fueling location.

18. The method according to claim 17, further comprising reserving a fuel pump at the at least one fueling option based on an arrival time of the autonomous vehicle as defined in the trip schedule.

* * * * *